No. 733,769. PATENTED JULY 14, 1903.
W. T. TEMPLE.
BRIDLE BIT.
APPLICATION FILED JULY 15, 1902.
NO MODEL.
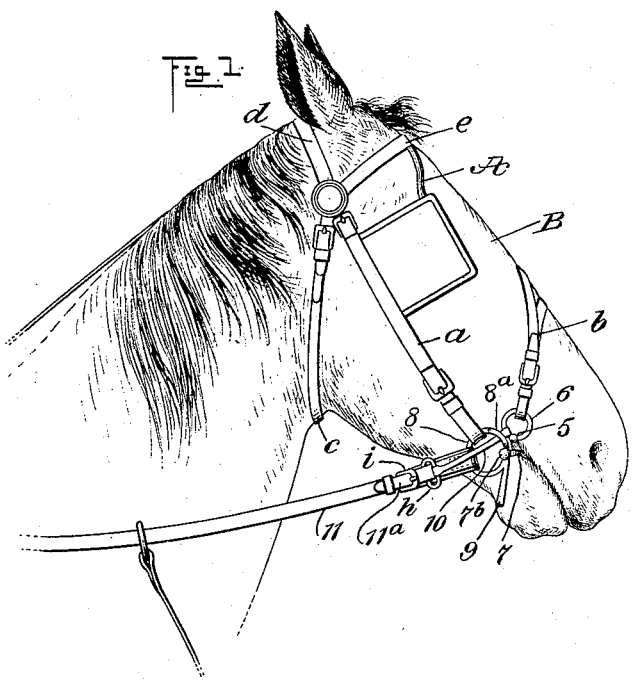
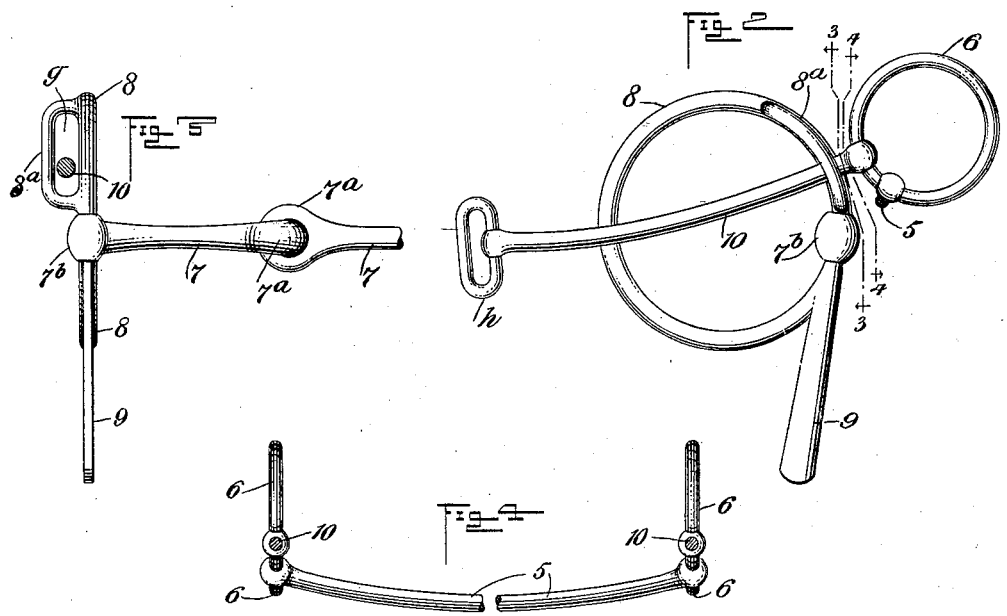
WITNESSES:
INVENTOR
William T. Temple
BY
ATTORNEYS.

No. 733,769. Patented July 14, 1903.

UNITED STATES PATENT OFFICE.

WILLIAM T. TEMPLE, OF TRENTON, NEW JERSEY.

BRIDLE-BIT.

SPECIFICATION forming part of Letters Patent No. 733,769, dated July 14, 1903.

Application filed July 15, 1902. Serial No. 115,672. (No model.)

*To all whom it may concern:*

Be it known that I, WILLIAM T. TEMPLE, a citizen of the United States, and a resident of Trenton, in the county of Mercer and State of New Jersey, have invented a new and Improved Bridle-Bit, of which the following is a full, clear, and exact description.

The object of this invention is to provide a riding or driving bit which may be used on such animals as have tender mouths or the reverse and afford means for the control of the animal in case it becomes fractious and is hard in the mouth, but that will ordinarily serve to guide an animal without hurting the mouth.

The invention consists in the construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the improved bit applied for service. Fig. 2 is an enlarged side view of the same detached. Fig. 3 is a transverse sectional view substantially on the line 3 3 in Fig. 2, and Fig. 4 is a transverse sectional view substantially on the line 4 4 in Fig. 2.

The improvement comprises two bits in one construction so connected that by a gentle pull on the bridle or driving-lines the horse or other animal may be guided as usual; but when in case of fright or other cause the animal becomes unruly and attempts to run away hard pulling upon the bit will bring into service the check-bit, which will produce severe strain on the animal's mouth and arrest the attempt before injury is done to the animal or the driver.

In carrying into effect the features of invention, A represents an ordinary bridle composed of the duplicated cheek-strap $a$, nose-strap $b$, throat-latch strap $c$, head-stall $d$, and forehead-strap $e$, these parts being connected in the usual manner, so as to fit upon the head B of a horse.

The check-bit consists of a transverse bar 5, coupled at each end with a ring 6, and, as shown in Fig. 1, one end of the nose-strap $b$ is joined to one of these bit-rings 6, it being understood that the other end of said nose-strap is in a like manner connected with the other bit-ring 6.

The driving-bit, which coacts with the check-bit for the control of an animal, is in the form of two link-bars 7, jointed together by two ring-eyes $7^a$, as represented in Fig. 3, wherein one of said link-bars is shown complete and the other one broken away, it being obvious that for effective service both link-bars should be alike in length and shape.

Upon the outer ends of the link-bars 7 the similar draft-rings 8 are affixed, and each of said rings is preferably furnished with a depending guard-limb 9. A boss-like enlargement $7^b$ is formed on the outer end of each link-bar 7, through which enlargement the duplicate rings 8 pass and in which said rings are respectively secured, so as to give the guard-limbs 9 the same downward inclination.

Above the bosses $7^b$ a guide-bar $8^a$ is formed or secured on each ring 8, said guide-bars having their ends bent a like degree, as shown in Fig. 3, and said bent ends joined upon the outer side of a draft-ring 8, thus affording a slot-like opening $g$ between the guide-bar and the surface of the ring. A connecting-bar 10 is provided to couple each ring 6 with the forward end of the bridle-rein 11, as shown in Fig. 1. The connecting-bars 10 each pass through a respective slot-like opening $g$ intermediately of its ends, one of said ends of the bar being loosely connected with a ring 6 and the other end provided with a loop formation $h$.

The ends of the driving bridle strap or rein 11, which are respectively attached upon the draft-rings 8, have this connection formed by folding a respective end of the bridle strap or rein upon itself and passing said folded portions $11^a$ through the rings 8. The strap ends $11^a$ are also inserted, respectively, through an appropriate loop formation $h$ and then engage a buckle $i$, secured upon the body of the bridle-strap.

It will be seen that the construction and arrangement of parts effect novel positive connection of the driving-bit and check-bit with the driving bridle strap or rein.

In service the animal may be guided effectively by gently pulling on the proper end of the bridle strap or rein, which pull will be transmitted to the rings 6 by the connecting-bar 10, jointed upon said rings, and more directly to the rings 8 on the jointed bit-bar 7.

If from any cause the beast becomes unmanageable, by employment of the improved bit the driver can produce a very severe strain upon the tongue and corners of the animal's mouth by forcibly drawing upon the reins 11 so as to jam both bars 5 and 7 into the corners of the mouth, the bar 5 pressing downward on the joint 7ª, so as to cause it to bear forcibly upon said joint and press the tongue painfully beneath the joint 7ª, the uppermost bit-bar 5 coacting with the main or driving bit 7 to worry the fractious animal and arrest its speed or prevent any attempt by the animal to get control of the reins by taking the bit in its teeth.

A very advantageous feature of the invention consists in the safety afforded in case of the accidental breakage of the jointed driving-bit 7, as the check-bit 10 will remain in the mouth of the animal and enable the driver to control the animal, which otherwise would be released from control if the two separate bits, both connected with the driving-lines, were not employed.

Having thus described my invention, I claim as new and desire to secure by Letters Patent—

1. The combination with a check-bit, comprising a plain bar, and a ring on each end of the bar, of a driving-bit embodying two draft-rings each having a slot-like opening, a jointed cross-bar attached at its ends upon the draft-rings, and bars for connecting the rings on the driving-bit with each driving-rein, said connecting-bars having slidable engagement within the slot-like openings.

2. The combination with a check-bit, comprising a plain cross-bar and a ring secured upon each end of said bar, of a driving-bit, embodying a cross-bar jointed at its center of length, two draft-rings secured on the ends of said jointed cross-bar, each draft-ring having a slot-like opening, a connecting-bar passed through each slot or opening and across the draft-ring, said connecting-bars being respectively jointed upon the check-bit rings, and means for securing the other ends of the connecting-bars upon the ends of a driving strap or rein.

3. The combination with a bridle, of a bit device composed of a check-bit bar, plain in its body, and two rings on the ends of said bar, a cross-bar jointed at its center of length, two draft-rings, each having a slot-like opening above their junction with the cross-bar, a guard-limb depending from each draft-ring, and two similar connecting-bars attached by one end of each bar upon a respective check-bit ring, and furnished at the opposite end of each bar with a loop for connection with the lapped end of a bridle-rein, which at its fold engages a respective draft-ring.

In testimony whereof I have signed my name to this specification in the presence of two subscribing witnesses.

WILLIAM T. TEMPLE.

Witnesses:
WILLIAM E. RILEY,
EDWARD Y. TEMPLE.